United States Patent
Hsu et al.

(10) Patent No.: US 9,223,924 B2
(45) Date of Patent: Dec. 29, 2015

(54) METHOD AND SYSTEM FOR MULTI-PATTERNING LAYOUT DECOMPOSITION

(71) Applicant: Taiwan Semiconductor Manufacturing Co., Ltd., Hsin-Chu (TW)

(72) Inventors: Chin-Hsiung Hsu, Guanyin Township (TW); Chin-Chang Hsu, Banqiao (TW); Yuan-Te Hou, Hsinchu (TW); Godina Ho, Hsinchu (TW); Wen-Hao Chen, Hsin-Chu (TW); Wen-Ju Yang, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 272 days.

(21) Appl. No.: 14/043,890

(22) Filed: Oct. 2, 2013

(65) Prior Publication Data

US 2015/0095857 A1 Apr. 2, 2015

(51) Int. Cl.
*G06F 17/50* (2006.01)
*G03F 1/00* (2012.01)

(52) U.S. Cl.
CPC .............. *G06F 17/5081* (2013.01); *G03F 1/00* (2013.01); *G06F 17/5068* (2013.01); *G06F 2217/12* (2013.01)

(58) Field of Classification Search
CPC .. G06F 17/5068; G06F 17/5081; G03F 1/144
USPC ...................................................... 716/50–56
See application file for complete search history.

(56) References Cited

U.S. PATENT DOCUMENTS

| | | | | |
|---|---|---|---|---|
| 8,234,599 B2* | 7/2012 | Sahouria | ................ | G03F 1/144 716/104 |
| 8,365,102 B2 | 1/2013 | Wang et al. | | |
| 8,434,043 B1 | 4/2013 | Hsu et al. | | |
| 8,468,470 B2 | 6/2013 | Hsu et al. | | |
| 8,674,893 B2* | 3/2014 | Ecclestone | ............. | H01Q 1/002 343/753 |
| 8,751,974 B2* | 6/2014 | Kahng | .................... | G03F 1/144 716/110 |

(Continued)

OTHER PUBLICATIONS

Hsu, C.H. et. al., "Simultaneous Layout Migration and Decomposition for Double Patterning Technology", IEEE Transactions on Computer-Aided Design of Integrated Circuits and Systems, Feb. 2011, 30(2):284-294.

(Continued)

*Primary Examiner* — Stacy Whitmore
(74) *Attorney, Agent, or Firm* — Duane Morris LLP

(57) ABSTRACT

A portion of a layout of a single layer of an integrated circuit is to be multi-patterned. A method for layout decomposition includes determining spacings between adjacent pairs of patterns, and generating a conflict graph having a plurality of sub-graphs, in which a respective vertex corresponds to each respective sub-graph. The patterns within each respective sub-graph are divided into at least a first group and a second group, each of which is assigned to be patterned on the single layer by a respectively different one of a first mask or a second mask. The method further include determining, in a processor, a count of color-rule violations in the plurality of patterns within each respective sub-graph based on a predetermined set of criteria; and within each sub-graph, assigning the first group of patterns in the sub-graph to the one of the first mask or the second mask which results in a smaller count of color-rule violations.

20 Claims, 14 Drawing Sheets

(56) References Cited

U.S. PATENT DOCUMENTS

| | | | |
|---|---|---|---|
| 8,799,844 B2* | 8/2014 | Cho | G03F 1/68 716/116 |
| 2010/0023914 A1* | 1/2010 | Sahouria | G03F 1/144 716/50 |
| 2010/0229145 A1* | 9/2010 | Sahouria | G03F 1/144 716/124 |
| 2011/0078638 A1* | 3/2011 | Kahng | G06F 17/50 716/52 |
| 2012/0072875 A1* | 3/2012 | Ghosh | G06F 17/5081 716/52 |
| 2012/0196230 A1* | 8/2012 | Cho | G03F 1/68 430/319 |
| 2012/0210279 A1 | 8/2012 | Hsu et al. | |
| 2013/0159945 A1* | 6/2013 | Kahng | G06F 17/50 716/52 |
| 2013/0321789 A1* | 12/2013 | Arai | G06F 17/50 355/77 |
| 2014/0065728 A1* | 3/2014 | Agarwal | G06F 17/5081 438/4 |
| 2014/0237435 A1* | 8/2014 | Chen | G06F 17/5072 716/52 |
| 2014/0245237 A1* | 8/2014 | Cilingir | G03F 7/70433 716/51 |
| 2014/0282293 A1* | 9/2014 | Lin | G06F 17/5081 716/52 |
| 2015/0100935 A1* | 4/2015 | Lin | G06F 17/5081 716/111 |

OTHER PUBLICATIONS

U.S. Appl. No. 13/737,192, filed Jan. 9, 2013.
U.S. Appl. No. 13/955,313, filed Jul. 31, 2013.

* cited by examiner

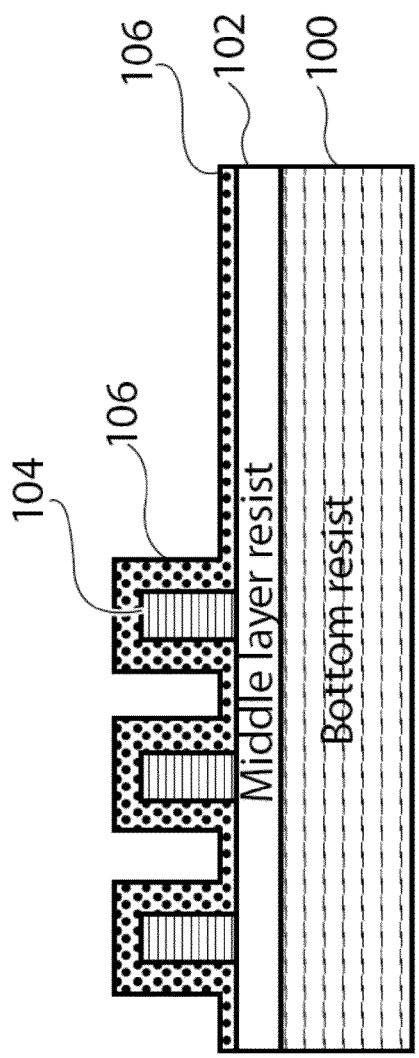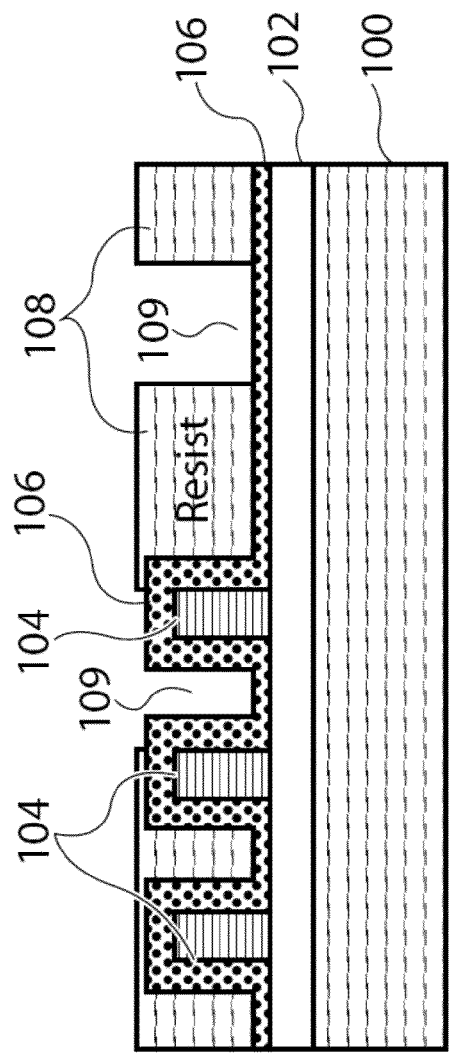

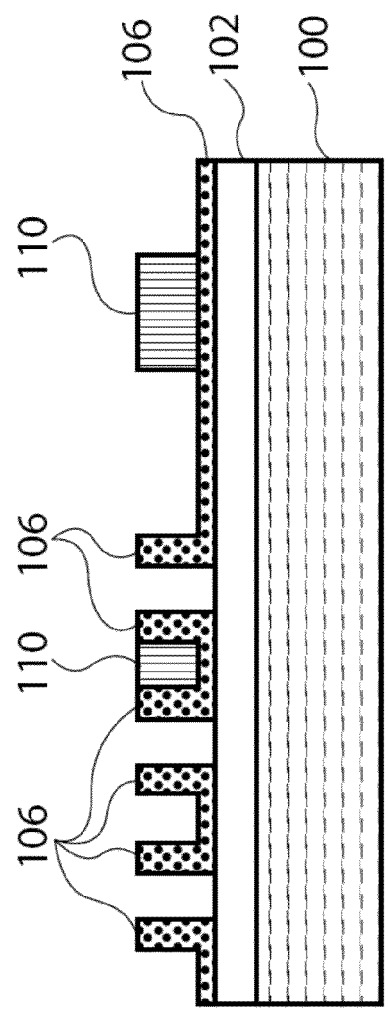
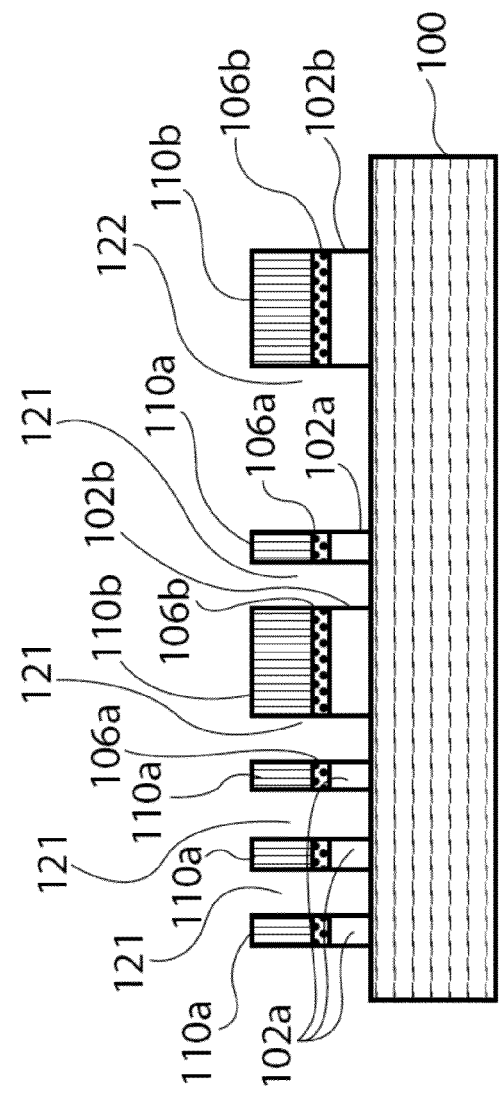
FIG. 1E
FIG. 1F

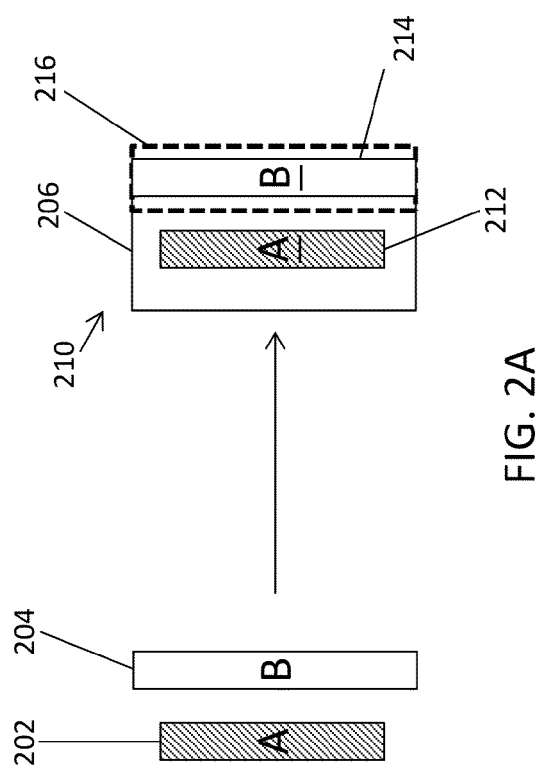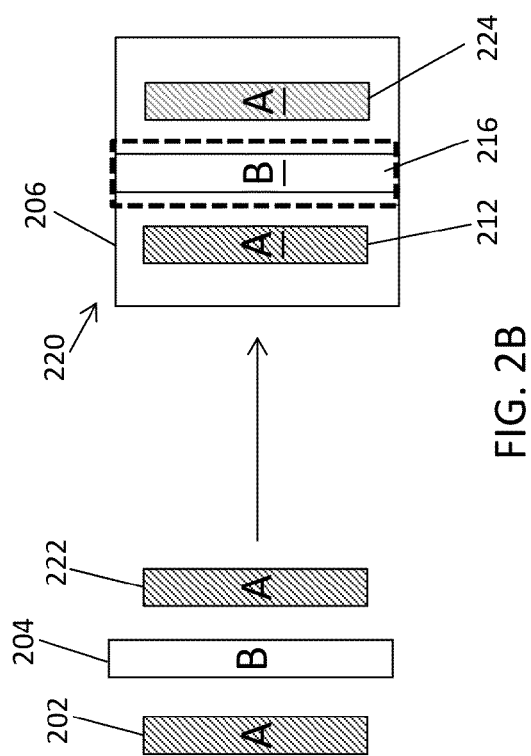

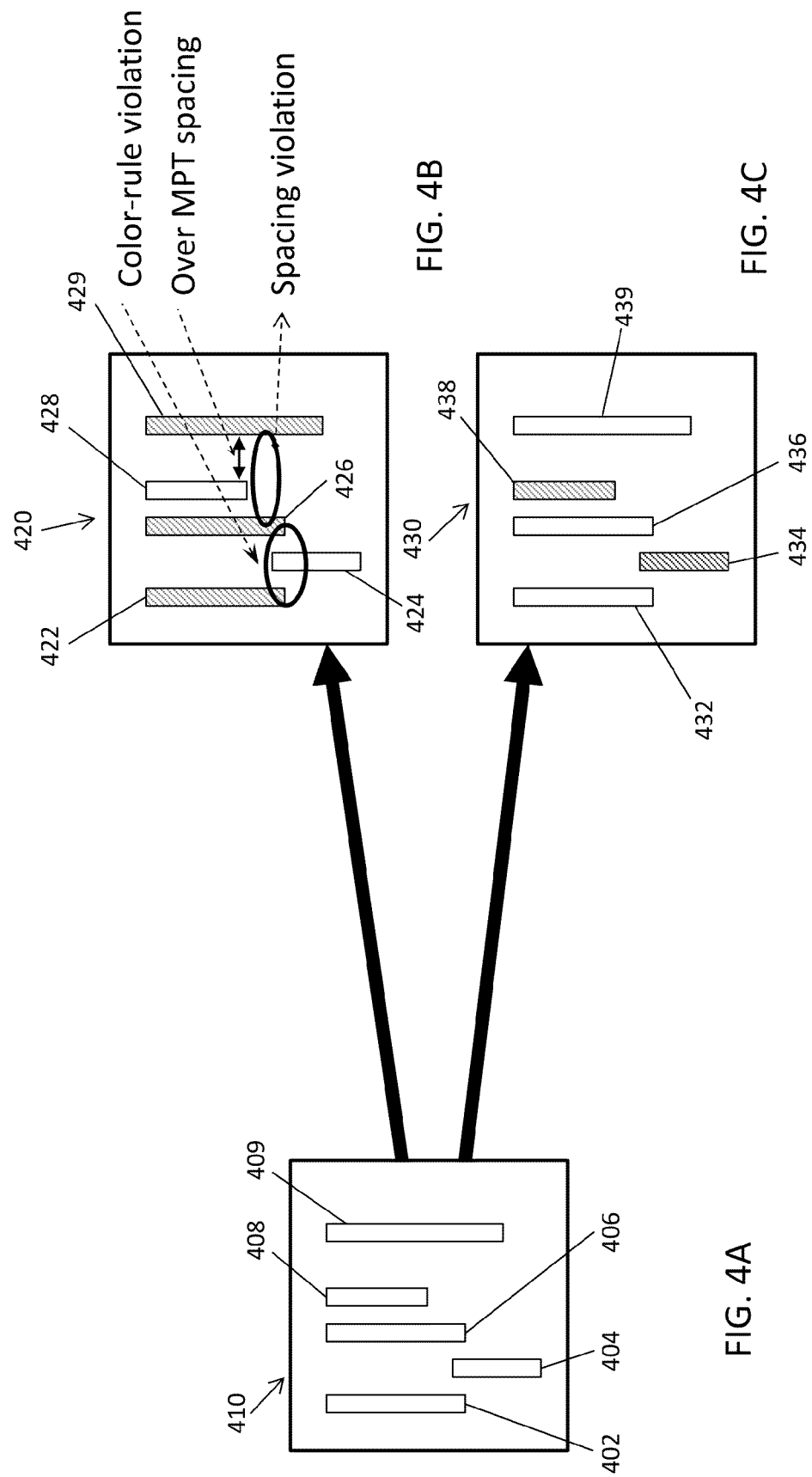

METHOD AND SYSTEM FOR MULTI-PATTERNING LAYOUT DECOMPOSITION

FIELD

This disclosure relates to semiconductor fabrication generally, and more specifically to electronic design automation tools.

BACKGROUND

In semiconductor integrated circuit (IC) fabrication processes, the resolution of a photoresist pattern begins to blur at about 45 nanometer (nm) half pitch. To continue to use fabrication equipment purchased for larger technology nodes, multiple patterning methods have been developed.

Multiple patterning technology (MPT) involves forming patterns on a single layer over a substrate using two or more different masks in succession. As long as the patterns within each individual mask comply with the relevant minimum separation distances for the technology node, the combination of patterns formed using the plural masks may include smaller spacings than the minimum separation distance design rule. Thus, MPT provides flexibility and generally allows for significant reduction in overall IC layout.

MPT is a layout splitting method analogous to an M-coloring problem for layout splitting in graph theory, where M is the number of masks used to expose a single layer (and the number of exposures). For example, if two masks are to be used (double patterning technology, DPT), it is customary to refer to the patterns as being assigned one of two "color types", where the color corresponds to a photomask assignment. As used herein, DPT is an example of MPT, so that generic references to MPT include DPT as one non-limiting example.

Some multi-patterning methods, such as the litho-etch-litho-etch (LELE) method use plural reticles in succession for patterning a single layer. Other multi-patterning methods, such as the self-aligned double patterning (SADP) method, use one reticle as a first mask to pattern a resist, and then form spacers adjacent those patterns, and use the spacers as a hard mask for further etching.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

FIGS. 1A-1F are cross-sectional diagrams showing various steps in a Multiple-Patterning-Multiple-Spacer (MPMS) process.

FIGS. 2A and 2B illustrate two exemplary MPMS processes showing two mask layouts and the resulting conductive patterns formed in a single layer.

FIGS. 4A-4C show an exemplary method for layout decomposition to provide a mask assignment without color violation and spacing violation through switching mask assignments ("color swapping") between the first group and the second group of patterns.

DETAILED DESCRIPTION

Figure 1C:
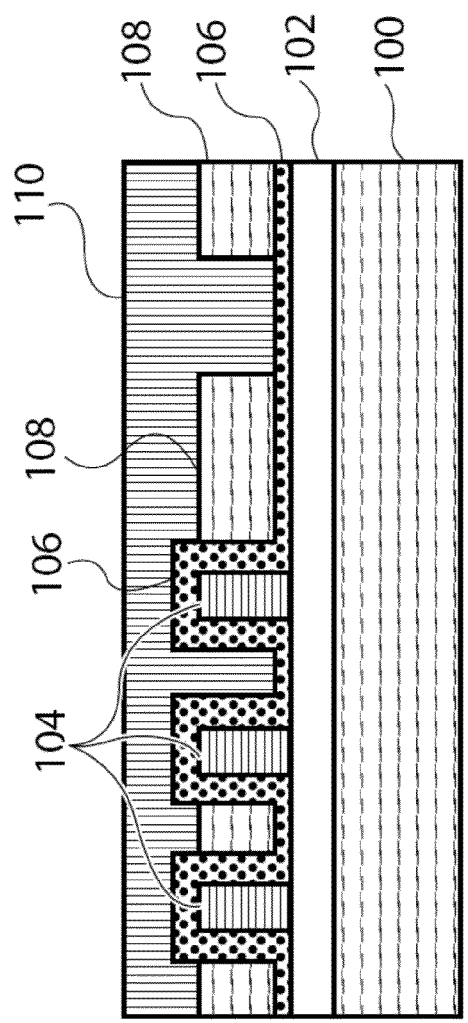

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Several multi-patterning methods, such as Self-Aligned Double Patterning (SADP), Multiple-Patterning-Multiple-Spacer (MPMS), Self-Aligned-Litho-Etch (SALE), LELE and Litho-Etch-Litho-Etch-Litho-Etch (LELELE) can use different process steps to form and/or pattern a substrate with two masks.

As used herein, the term "first mask" or "mask A" refers to a photomask (reticle) used in a photolithography process to expose a photoresist in a single layer over the substrate; the term "second mask" or "mask B" can refer to a second photomask or a second hardmask used to pattern the same layer. The "first mask" or "mask A" and the "second mask" or "mask B" are used to pattern two separate sets of polygons (circuit patterns, such as conductive lines) in the same layer over the substrate. For example, two separate sets of patterns such as conductive lines are denoted as A and B, respectively. The second mask is used to pattern a second group of lines (or other polygons) by a process that can be different from the process used to pattern a first group of lines using the first mask.

In one non-limiting example of an LELE process, the second mask is a photomask used for a second exposure step in the same layer of photoresist. In another non-limiting example of an SADP process, after the first exposure and etching step, a conformal layer is formed over the first patterns, and planarized to form sidewall spacers. The side wall spacers constitute the second mask. This (SADP) process is an example of a method in which the second patterns are formed by different process steps than are used to form the first patterns.

In a multi-patterning method where (the second group of) lines are patterned by the second mask using a different process than the process used to pattern the (first group of) lines using the first mask, the second group of lines can have a different width bias than the first group of lines. For example, the first group of lines may have a nominal width and nominal spacing, but the second group of lines can have a larger than nominal width. Further, the variance of the width and/or spacing of the second patterns can be different from the variance of the width and/or spacing of the first patterns.

FIGS. 1A-1F show a non-limiting example of a Multiple-Patterning-Multiple-Spacer (MPMS) process, for which the routing and mask assignment methods described below are suitable. This is a different example of a process in which the second mask is to be formed by spacers in the layer of the substrate, the spacers to be formed on side walls of lines to be patterned by the first mask.

In FIG. 1A, a substrate having a bottom resist layer 100, and a middle resist layer 102 is provided. A top layer of photoresist 104 has been patterned using a first photomask, and etched to form a set of sacrificial resist lines (mandrels) 104. A conformal spacer layer 106, such as an oxide or nitride layer is deposited over the mandrels 104 (for example using atomic layer deposition, ALD).

Another layer of resist 108 is deposited over the spacer layer 106, and patterned using a second photomask (not shown) to form additional sacrificial patterns 108 separated by openings 109. The resulting configuration is shown in FIG. 1B.

A negative resist, silicon hard mask or ALD oxide layer 110 is deposited over the substrate as shown in FIG. 1C.

Figure 1D:
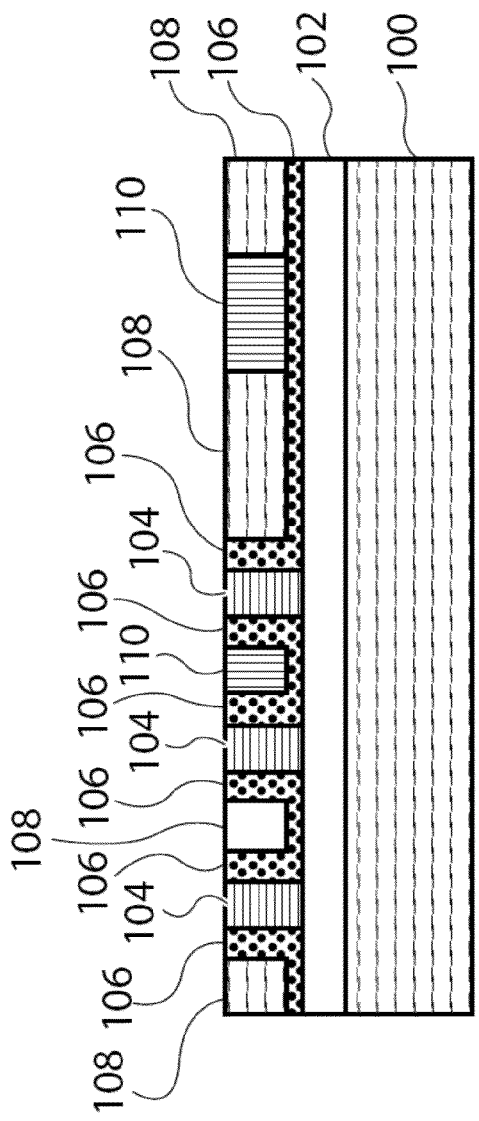

The substrate is then etched back non-selectively, as shown in FIG. 1D.

The substrate is selectively etched to remove resist layer 108, as shown in FIG. 1E.

The substrate is then anisotropically etched (e.g., by plasma etch) to remove the middle resist layer 106 and bottom resist layer 102, as shown in FIG. 1F. The substrate now has a plurality of openings 121 to be filled with conductive material (e.g., copper) for forming the "A patterns" and opening 122 to be filled with conductive material (e.g., copper) for forming the "B patterns". The first mask and second mask have patterns (lines) with respectively different widths, and the resulting A patterns and B patterns are formed by separate processes and have different widths.

Referring to FIGS. 2A and 2B, two mask layouts 202 and 204 (mask A and mask B) are used in two exemplary MPMS processes. The resulting patterns 212 and 214 (conductive lines A and B) are formed in a single layer of a portion of device 210 and 220. At least one of the resulting patterns 212 and 214 such as conductive line A is formed inside a layer of spacer 206, which is not conductive. In such MPMS processes, the use of spacer 206 prevents short circuiting between conductive lines A and B even if there is a misalignment (overlay error, OVL) between the two mask layouts 202 and 204 (mask A and mask B). In some embodiments, as shown in FIG. 2A, non-symmetric retargeting, which enlarges pattern width on mask B, is applied to avoid minimum width violation caused by overlay error. The overlay error can make a minimum-width conductive line overlay with spacers, such that the width of the conductive line is smaller than the minimum width requirement for manufacturing. However, non-symmetric retargeting and the misalignment of the two mask layouts 202 and 204 can result in width variation of the resulting pattern 214 (conductive lines B), for example, the pattern 214 can be located within a range 216 in FIG. 2A. In some embodiments, as shown in FIG. 2B, width variation caused by non-symmetric retargeting can be reduced while a pattern on mask B is surrounded by plurality of patterns on mask A, for example, within a range 216 in FIG. 2B.

The present disclosure provides a method for decomposing a designed pattern layout to be multi-patterned, and a system programmed to perform such a method. The designed pattern layout has a plurality of patterns representing circuit elements of an integrated circuit (IC). The method and the system are used for multi-patterning, such as a Multiple-Patterning-Multiple-Spacer (MPMS) process.

For brevity, references to "multi-patterning" made in this disclosure will be understood to encompass both double patterning and more-than-two patterning, unless expressly indicated otherwise.

Figure 5A:
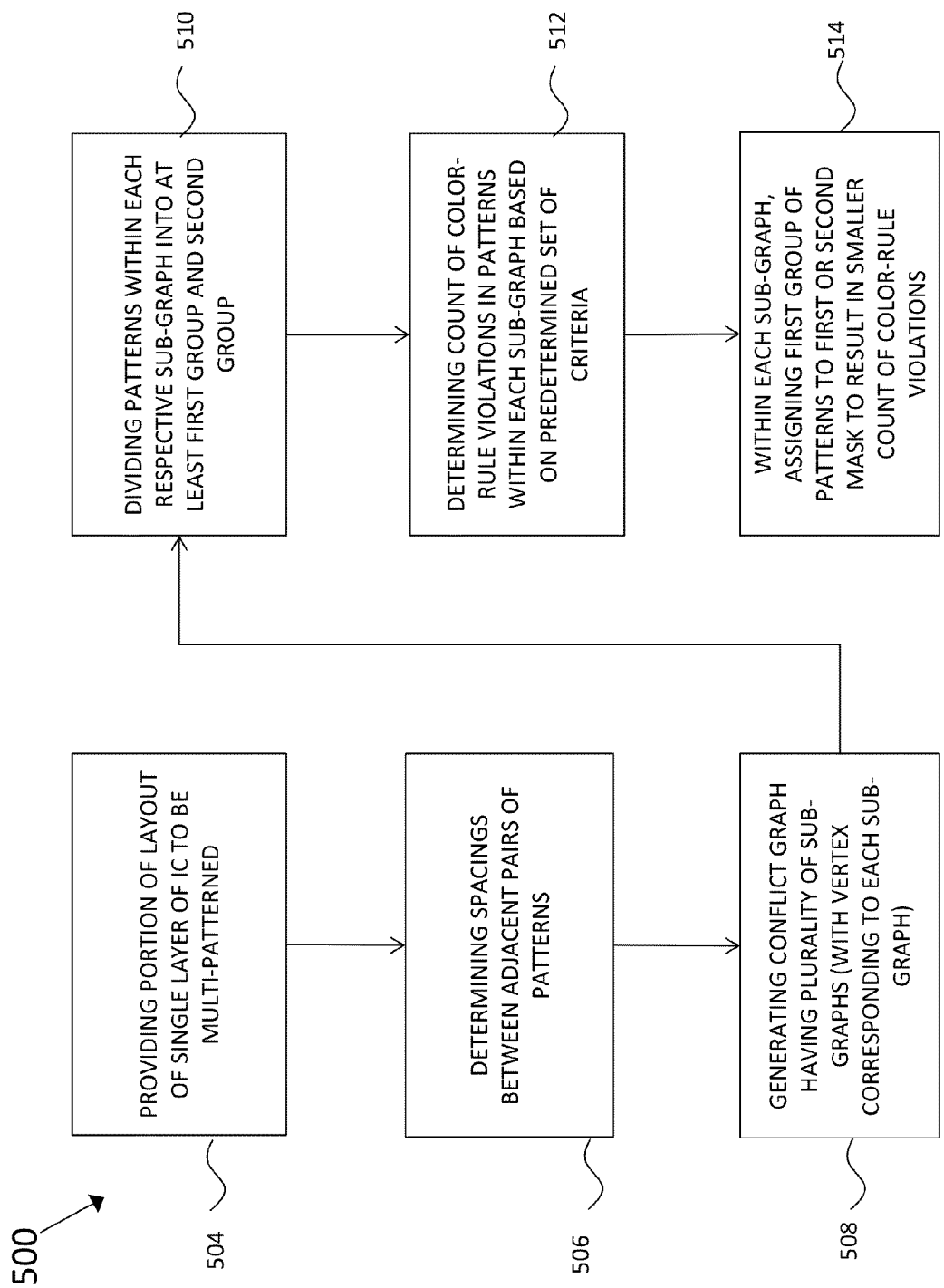
FIGS. 5A and 5B are flow charts showing a method for layout decomposition in accordance with some embodiments.
Figure 5B:
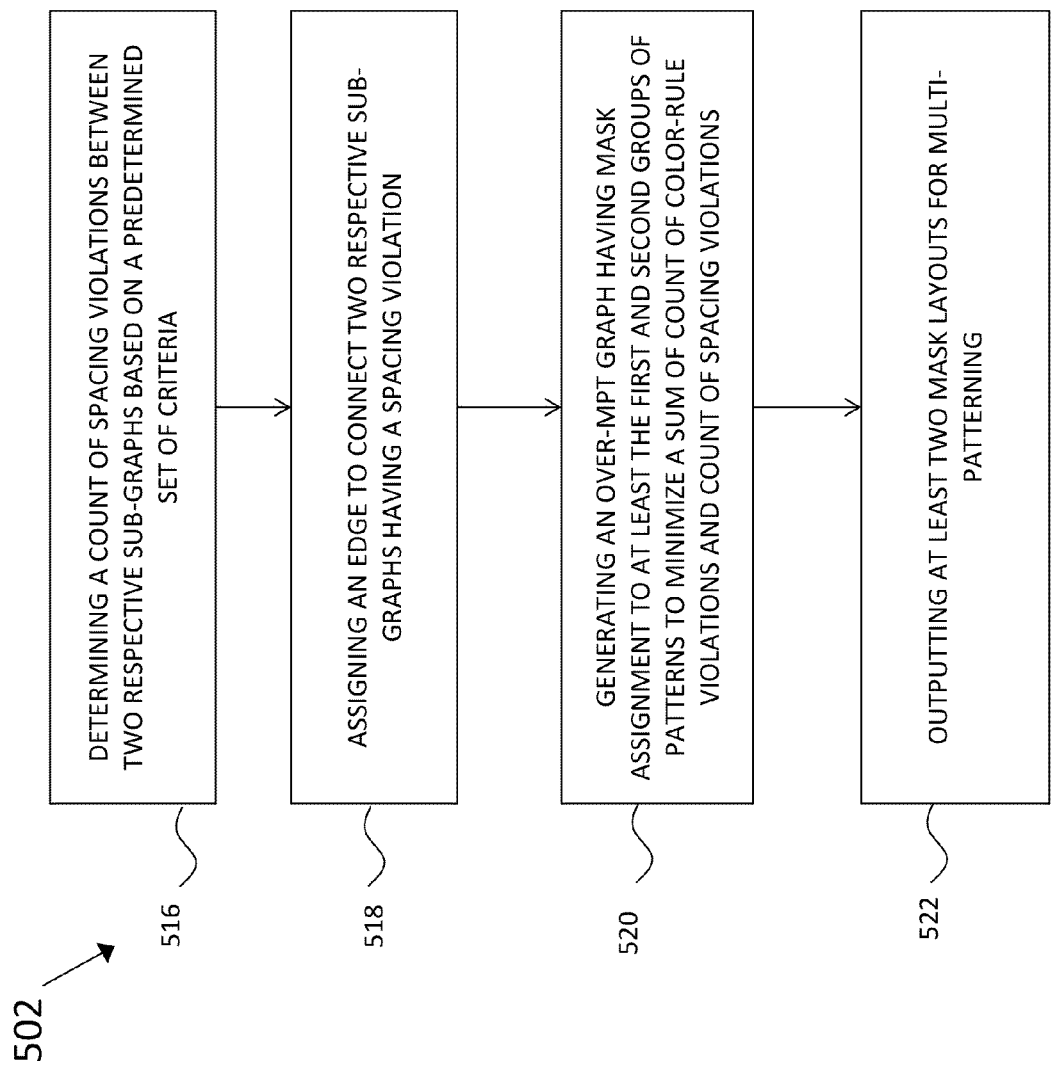
Figure 10:
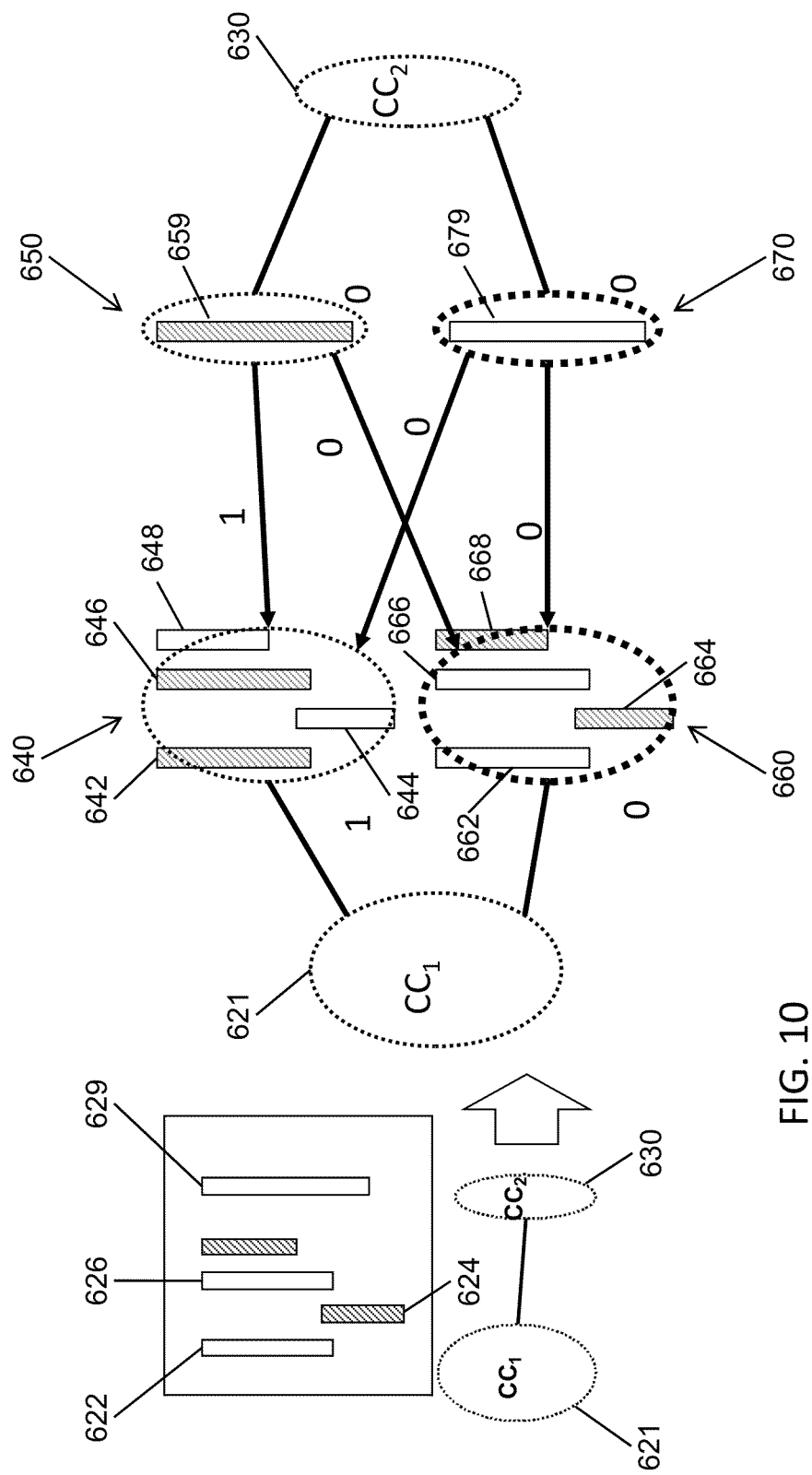
FIG. 10 illustrates a step of generating an over-multi-patterning-technology (Over-MPT) having a mask assignment to at least the first and second groups of the patterns to minimize a sum of the count of color-rule violations and the count of the spacing violations.
Figure 11:
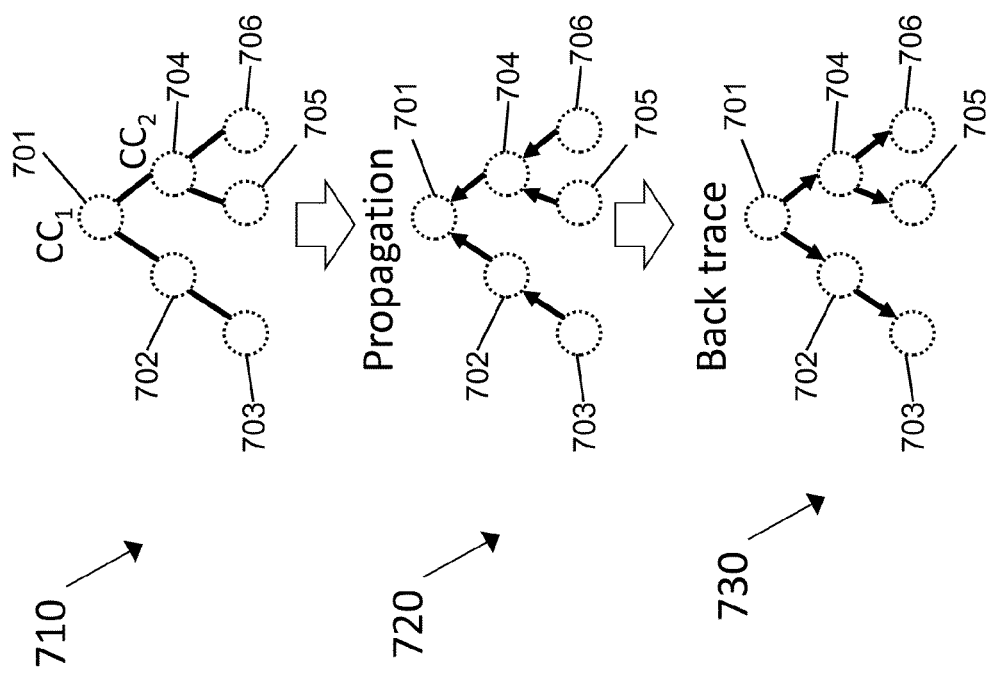
FIG. 11 illustrates a method for layout decomposition, in which a tree-based dynamic programming is used, in accordance with some embodiment.
Figure 12:
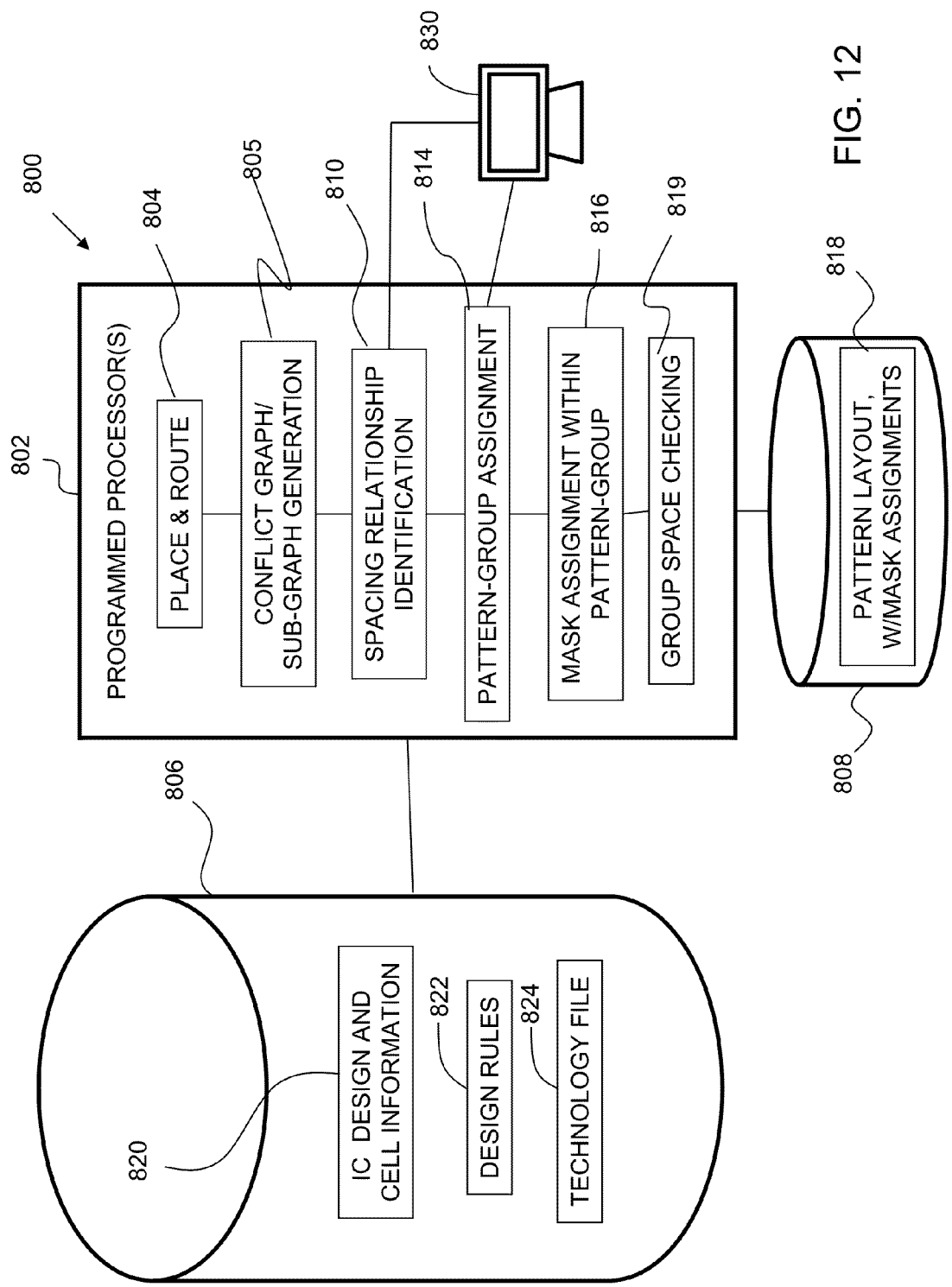
FIG. 12 is a block diagram of an embodiment of a system for performing a method as described herein.

The methods shown in FIGS. 5A and 5B are first described with reference to the exemplary structure described in FIGS. 3A, 3B, 6-8, 9A, 9B, 10 and 11. The system described in FIG. 12 is described with reference to the exemplary methods described in FIGS. 5A and 5B.

Figure 3B:
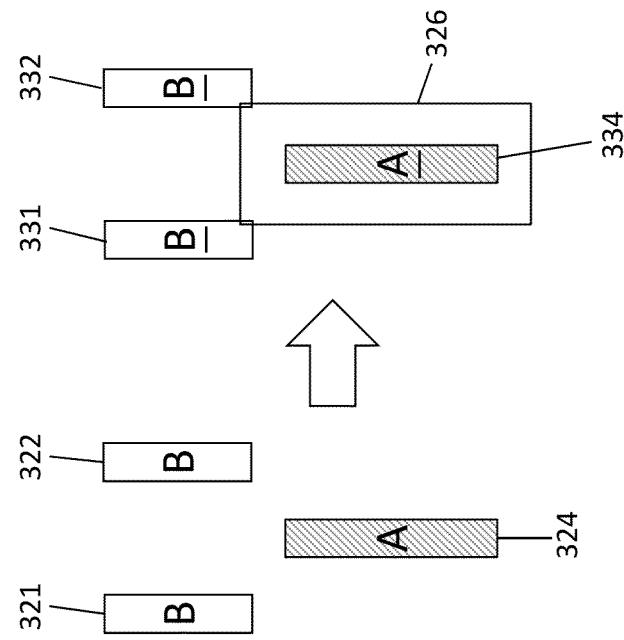
FIG. 3B shows an exemplary mask assignment without color-rule violation after switching mask assignments ("color swapping") between the first group and the second group of patterns.
Figure 3A:
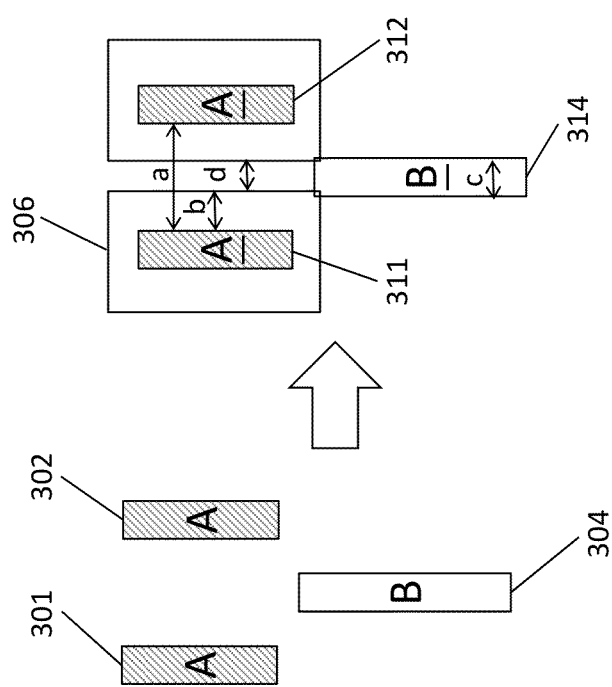
FIG. 3A shows an exemplary mask assignment having color-rule violation.

The method is used to ensure that the layout decomposition does not cause any conflicts such as "color-rule" violations or "spacing violations," as generally shown in FIGS. 3A, 3B and 4 (and explained below). The "color-rule" violations and the "spacing violation" are defined based on a respective predetermined set of criteria.

When the first patterns and second patterns are formed using different process steps from each other, clear pattern formation depends not only on the grouping of patterns, but on which group is assigned to which specific mask. For a given layout and grouping of patterns, assume that the first patterns can be clearly formed using the first mask, and the second patterns can be clearly formed using the second mask. The converse may or may not be true. In some situations, for the same layout and grouping, forming the first patterns using the second mask and forming the second patterns using the first mask ("color swapping") can cause a color rule violation or spacing violation.

In some embodiments, the spacing design rules between two patterns formed using the second mask can be different from the spacing design rules between two patterns formed using the first mask. In other words, every process has its own desirable ranges for spacing between two patterns. If the spacing between two patterns is within the desirable ranges of a process, the two patterns can be manufactured well. Otherwise the two patterns cannot be manufactured well. Therefore, spacing design rules, also called forbidden spacing, are presented to avoid that spacing between two patterns out of desirable ranges of the process.

FIG. 3A shows an exemplary mask assignment having a color-rule violation between patterns to be formed by mask A (mask layout patterns 301 and 302) and mask B (mask layout patterns 304). FIG. 3B shows an exemplary mask assignment without color-rule violation after switching mask assignments ("color swapping") between mask A (mask layout patterns 321 and 322) and mask B (mask layout pattern 324). In color swapping, the groupings of patterns are not changed, but the specific mask used to pattern each group (also referred to as the "color" of each group) is changed.

Referring to FIG. 4A, a portion of a layout 410 of a single layer of an IC has a plurality of patterns 402, 404, 406, 408, and 409 representing circuit elements. This portion of layout 410 is decomposed into at least two mask layouts. In the mask assignment 420, two mask layouts contain both color violation and spacing violation. The first group of the patterns 422, 426 and 429 (shaded polygons in FIG. 4B) are assigned to the first mask. The second group of patterns 424 and 428 are assigned to the second mask. As illustrated in the mask assignment 420, a color-rule violation exists among patterns 424, 422 and 426. A spacing violation exists between patterns 426 and 429 because the spacing between patterns 426 and 429 is within desirable ranges of the process for the second mask but is out of the desirable ranges of the process for the first mask.

Using an exemplary method in the present disclosure, a mask assignment 430 without color violation and spacing violation can be achieved, for example, through switching mask assignments ("color swapping") between the first group and the second group of patterns. In the mask assignment 430, neither color-rule violation nor spacing violation exists in the two masks: the first mask including mask layout patterns 432, 436 and 439; and the second mask including the shaded mask patterns 434 and 438. The first group of the patterns 422, 426, 429 and the second group of patterns 424, 428 are the same in both FIGS. 4B and 4C. Nevertheless, because of the difference in processing steps, there are no violations when the first group of patterns is formed using the light colored mask and the second group of patterns is formed using the dark colored mask.

Referring to FIGS. 5A and 5B, an exemplary method including two portions 500 (FIG. 5A) and 502 (FIG. 5B) are used for layout decomposition in accordance with some embodiments.

Figure 6:
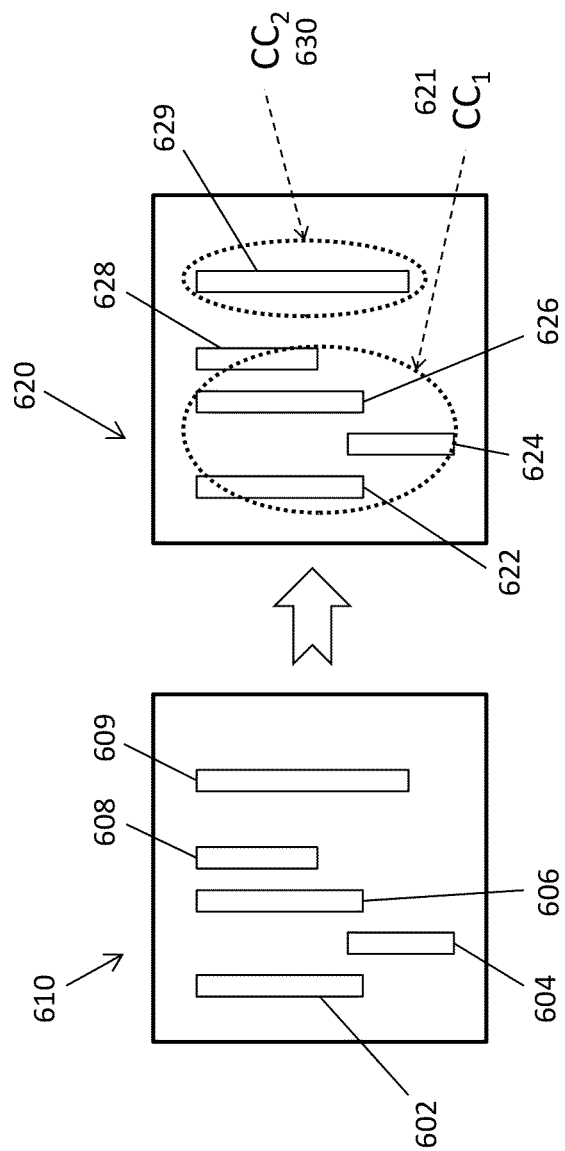
FIG. 6 illustrates a step of generating a conflict graph representing a portion of layout of a single layer of an integrated circuit, in which the patterns are grouped into a plurality of sub-graphs, and each vertex corresponds to each sub-graph.

At step 504, a portion of a layout, of a single layer of an integrated circuit to be multi-patterned is provided. For example, the portion can be the layout 610 in FIG. 6 can be retrieved from a non-transitory, machine readable storage medium. At step 504, a programmed processor receives the layout. Referring to FIG. 6, the portion of the IC layout 610 has a plurality of patterns 602, 604, 606, 608 and 609, which are a set of polygons (lines) representing circuit elements. The circuit elements may include conductive lines or conductive vias to be formed in a layer of a semiconductor IC. In some embodiments, the patterns of the layout are lines, to be patterned in the layer using a process for which the second mask has a different line width bias than the first mask. In some embodiments, the patterns of the layout are lines, to be patterned in the layer using a process for which a line width of a line formed by the second mask depends on a distance between that line and a nearest adjacent line on each side of that line.

At step 506, spacings between adjacent pairs of patterns within the plurality of patterns are determined. Referring to FIG. 6, for example, the spacings between any adjacent pairs from patterns 602, 604, 606, 608 and 609 are determined.

At step 508, a conflict graph 620 representing the IC layout 610 is generated. The conflict graph 620 has a plurality of sub-graphs, for example, sub-graph 621 (denoted as "$CC_1$") and sub-graph 630 (denoted as "$CC_2$"). The sub-graphs are also referred as "connected components" (CC). A conflict graph 620 is defined as the first-level graph for checking color-rule violations. A respective vertex (a dashed circle, for example, in conflict graph 620) is assigned corresponding to each respective sub-graph in conflict graph.

In some embodiments, in the step 508 of generating a conflict graph 620, the plurality of the patterns 602, 604, 606, 608 and 609 are subdivided into a plurality of sub-graphs 621 and 630, if two closest patterns from two respective sub-graphs, for example, pattern 628 in sub-graph 621 and pattern 629 in sub-graph 630, are separated from each other by a spacing greater than a first threshold distance. For example, the first threshold distance is a minimum separation distance. The first threshold distance can be an "over MPT spacing" as shown in FIG. 5B, for example, an G0-space in some embodiments. The distance between two adjacent patterns which is less than G0-space is too small to be on the same mask, but it is not so small to be beyond the capability of the technology node when MPT methods are used. In comparison, the spacing between any adjacent pairs of patterns within each sub-graph 621 or 630 (such as patterns 606 and 608 in sub-graph 621) is less than the first threshold distance, for example, G0-space in some embodiments.

Figure 7:
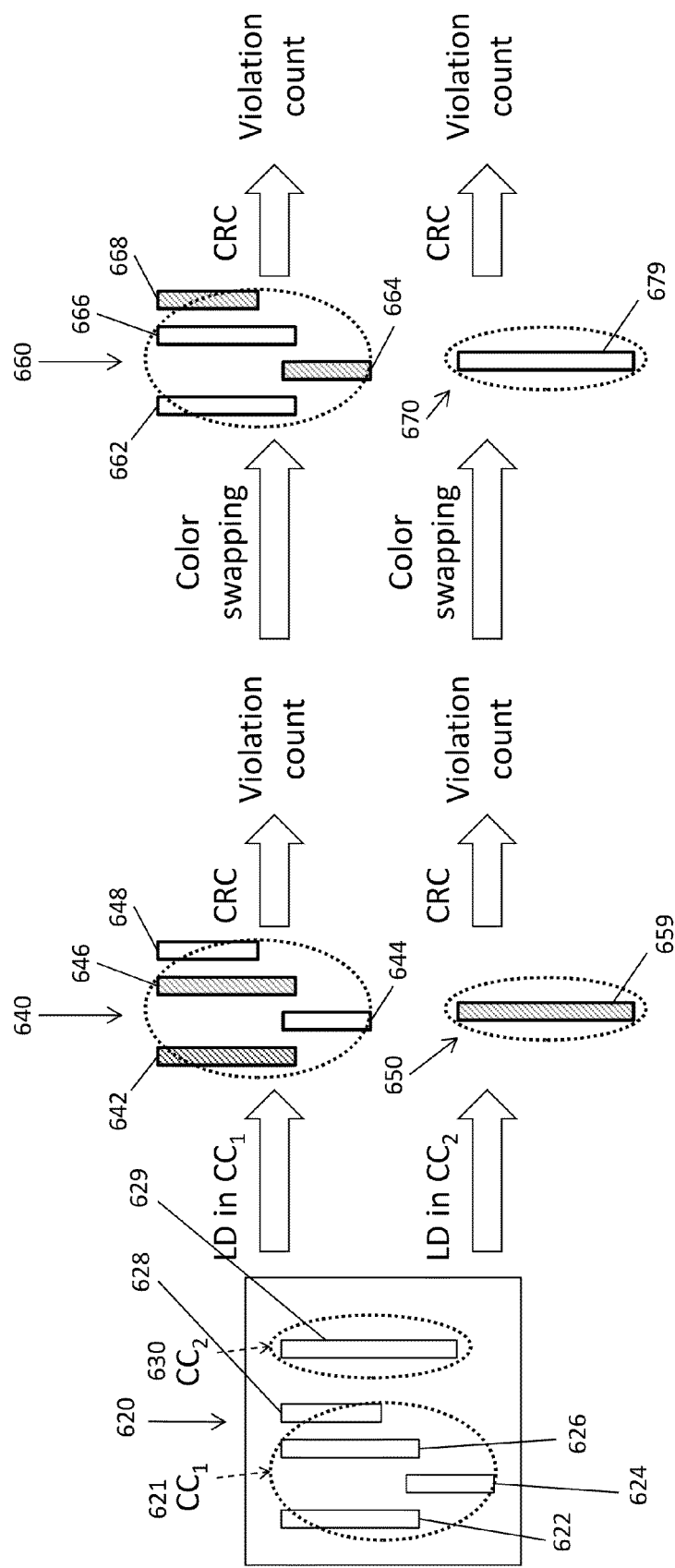
FIG. 7 illustrates steps of dividing patterns within each sub-graph into at least a first and a second group of patterns, assigning each group of patterns to the one of the first mask or the second mask, and determining a count of color violation within each sub-graph.

At step 510, the patterns within each respective sub-graph 621 ("$CC_1$") or 630 ("$CC_2$") are divided into at least a first group and a second group, in the process of layout decomposition (LD). Each of at least the first and second groups is to be assigned to be patterned on the single layer by a respectively different one of a first mask or a second mask. Referring to FIG. 7, for example, the patterns in sub-graph 621 are divided into two groups: the first group including patterns 622 and 626, and the second group including patterns 624 and 628. After a mask assignment, the patterns assigned to the first mask ("color") are illustrated in shaded polygons in FIG. 7, while the patterns assigned to the second mask ("color") are shown as white (un-shaded) polygons. As illustrated in FIG. 7, sub-graph 621 becomes sub-graph 640 or 660 after a mask assignment. Sub-graph 630 is represented by a single edge 659 (or 679) in sub-graph 650 (or 670) after a mask assignment.

At step 512, a processor determines a count of color-rule violations in the plurality of patterns within each respective sub-graph, based on a predetermined set of criteria. In the programmed processor, color-rule checking (CRC) is performed for each sub-graph after each mask assignment.

In some embodiments, the predetermined set of criteria for determining color-rule violations is based on the spacings and mask assignment of the at least the first and second groups. An exemplary color-rule violation is provided in FIG. 3A. In FIG. 3A, the polygons 301 and 302 are assigned to be formed using the first mask, and a pattern 314 is to be formed using spacers 306 surrounding lines 311 and 312.

As shown in FIG. 3A, the first group of patterns 301 and 302 is assigned to the first mask (shaded polygons) for making the conductive line 311 and 312. In the example of FIG. 3A, each pattern of the first group to be patterned on the single layer provides a first conductive line 311 or 312 embedded in a spacer material 306. Each pattern of the second group (including 304) to be patterned on the single layer provides a second conductive line 314 formed between adjacent ones of the spacer material 306 on the single layer. One of the second conductive lines 314 between a pair of first conductive lines 311 and 312 separated from each other by a spacing less than a preset distance results in a color-rule violation, if at least one corner of the second conductive line 314 contacts a line-end part of the spacer material 306 for at least one of two adjacent first conductive lines 311 and 312.

In another aspect, the distance between the spacers 306 is less than the desired width of the pattern 314 (in the second group of the patterns), causing a color-rule violation, when the first group of patterns 311 and 312 (shaded polygons, assigned to the first mask) are fabricated inside a spacer 306. Thus, a minimum spacing between two patterns (a) in the first mask separated by a pattern assigned to the second mask is twice the width of spacer 306 (b) plus the line width (c) of the pattern assigned to the second mask.

The similar color-rule violation is also reflected in mask assignment of sub-graph 640 in FIG. 7. In sub-graph 640, there is a color-rule violation among patterns 644, 642 and 646. The polygons 642 and 646 are assigned to be formed using the first mask, and a pattern 644 is to be formed using spacers (not shown in FIG. 7) surrounding lines 642 and 646. The distance between the spacers (not shown) is less than the desired width of the pattern 644, causing a color-rule violation.

At step 514, within each sub-graph, the processor assigns the first group of patterns in the sub-graph to the one of the first mask or the second mask which results in a smaller count of color-rule violations. Steps 512 and 514 can be performed sequentially or simultaneously. In some embodiments, the initial mask assignment can be performed after step 510. A count of color-rule violations within each sub-graph is determined in step 512. In some embodiments, the processor reiterates the mask assignment procedure, and changes one or more mask assignments, resulting in a smaller count of color violations in each sub-graph at step 514.

FIG. 3B illustrates an exemplary process to decrease the count of violations in each sub-graph. In some embodiments, a smaller number of color violations within each sub-graph can be achieved through a process called "color swapping." As illustrated in FIG. 3B with reference to FIG. 3A, the first group of patterns 301 and 302 in a same sub-graph is assigned to the first mask (in shaded polygons), while the second group of patterns 304 is assigned to the second mask. After a "color swapping," the second group of patterns 304 (i.e. pattern 324 in FIG. 3B) is assigned to the first mask. The first group of patterns 301 and 302 (i.e. patterns 321 and 322) is assigned to the second mask. The two masks are used to make the first conductive lines 334 inside a spacer 326 and the second conductive lines 331 and 332. The mask assignment in FIG. 3B does not have any color-rule violations.

Similar processes of "color swapping" are also illustrated in FIG. 7. For example, after color swapping, in the resulting sub-graph 660, the first group of patterns 662 and 666 is assigned to the second mask while the second group of patterns 664 and 668 is assigned to the first mask. The color-rule violation in sub-graph 640 has been eliminated. Similar mask assignment and "color swapping" can be also performed any other sub-graph such as sub-graph 630, which changes to sub-graph 650 or 670 as illustrated in FIG. 7.

Figure 8:
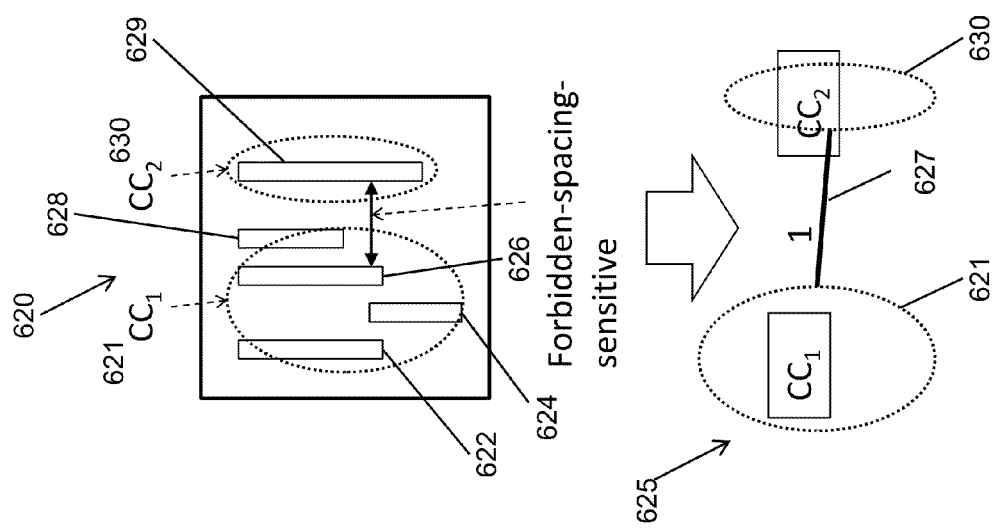
FIG. 8 illustrates a step of determining a count of spacing violations between two respective sub-graphs, in which an edge is assigned to connect two sub-graphs having a spacing violation.

Referring to FIG. 5B, at step 516, a count of spacing violations between two respective sub-graphs is determined based on a predetermined set of criteria for spacing violations in a processor. Referring to FIG. 8, for example, a count of spacing violations between two respective sub-graphs 621 and 630 can be determined if a predetermined set of criteria for spacing violations are met.

In some embodiments, a spacing violation between two respective sub-graphs is counted if the spacing between two patterns in two different respective vertices corresponding to the two respective sub-graphs is less than a second threshold distance. For example, a spacing violation between two respective sub-graphs 621 and 630 is counted if the spacing between two patterns in two different respective sub-graphs 621 and 630 is in the range from 100 nm to 140 nm. In some embodiments, the spacing in the range from 100 nm to 140 nm is not a desirable spacing range for the lithography process of the first mask, but is a desirable spacing range for the lithography process of the second mask. Desirable spacing ranges of a lithography process depend on wave length of light source and lithography types.

Figure 9A:
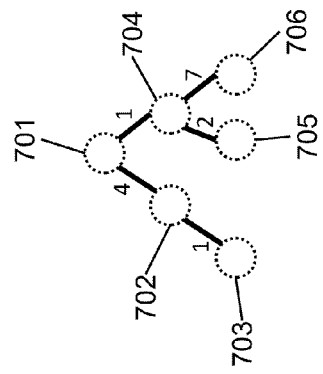
FIGS. 9A and 9B illustrate two an over-multi-patterning-technology (Over-MPT) graphs without and with a "cycle" of three edges connecting three vertices (sub-graphs), respectively.
Figure 9B:
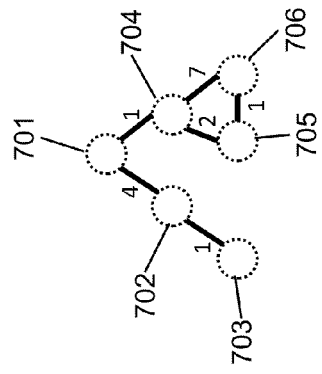

FIG. 8 shows construction of a portion of a tree-based conflict graph 625 representing the layout of conflict graph 620. At step 518, each sub-graph 621, 630 of conflict graph 620 is represented as a vertex CC1, CC2, respectively. An edge 627 is assigned in the conflict graph 625 (or the corresponding over-MPT graph to be generated at step 520) to connect two respective sub-graphs 621 and 630 having a potential spacing violation, as shown in FIG. 8. For example, if the spacing between patterns 626 and 629 is within non-desirable ranges of a lithography process of the first mask (e.g., mask A), and these two patterns 626 and 629 are also assigned to the first mask, a spacing violation is induced. If any one of these two patterns 626 and 629 are assigned to mask B, no spacing violation is induced. The edge is unconnected to any vertices corresponding to any other sub-graph (not shown in FIG. 8) if there are no spacing violations between said any vertices. FIGS. 9A and 9B illustrate two exemplary conflict graphs in which an edge between any adjacent pairs of the sub-graphs 701-706 is used to represent a spacing violation. In some embodiments, if any three adjacent sub-graphs are connected by edges to form a closed loop, due to spacing violations, the three sub-graphs are referred as a "cycle." FIGS. 9A and 9B illustrate two conflicts graphs without and with a "cycle" of three edges connecting three vertices (sub-graphs), respectively. As shown in FIG. 9B, three vertices corresponding to three sub-graphs 704, 705 and 707 forms a "cycle." At the following steps such as step 520, a "cycle" is to be considered first and should be avoided. A numbers on a respective edge in FIGS. 9A-9B represents the count of potential spacing violation between two respective sub-graphs.

At step 520, an over-multi-patterning-technology (Over-MPT) graph representing the layout is generated in the processor. An over-MPT graph is defined as the second-level graph for checking spacing violations. As illustrated in FIG. 10, the layout includes mask assignment to at least the first and second groups of the patterns to minimize a sum of the count of color-rule violations and the count of the spacing violations. In some embodiments, dynamic programming is used to obtain a minimum sum of both the count of color-rule violations inside sub-graphs and the count of the spacing violations between sub-graphs.

Referring to FIG. 10, same layout and mask assignments are considered, as described above with reference to FIG. 7. As illustrated in FIG. 10, the interactions between any two of possible mask assignments 640, 660, 650 and 670 for the two adjacent sub-graphs 621 and 630 are considered with an objective to minimize the sum of both color-rule violations and spacing violations. A number "1" or "0" next to a sub-graph or between two sub-graphs represents a violation or no violation. As shown in FIG. 10, a combination of mask assignment 660 and 670 for the two adjacent sub-graphs 621 and 630 provides no violation.

A tree-based dynamic programming method is used for mathematical treatment at step 520 in some embodiments. As illustrated in FIG. 11, a tree-based diagram 710 comprising different sub-graphs 701-706 is established, with different sub-tree paths established based on the spacings of the sub-graphs 701-706 in the layout to be multi-patterned. In a bottom-up approach ("propagation") as illustrated in a tree-based diagram 720, mask assignments are performed from the sub-graphs (e.g., 703, 705 and 706) first, and then next level of sub-graphs such as 702 and 704. A sub-tree path having minimum sum of both color-rule violations and spacing violations are recorded. In some embodiments, a top-down ("back trace") approach is used. Mask assignments are performed from the sub-graphs at the top level such as sub-graph 701, and then on next level of sub-graphs 702 and 704. The patterns in sub-graphs 703, 705, and 706 on the bottom of the tree-based diagram 730 are then assigned to either of the at least the first or the second mask. In some embodiments, the bottom-up approach ("propagation") can be used to provide desirable assignment for a corresponding sub-tree and record the paths for the desirable assignment for this sub-tree. In some embodiments, both the bottom-up approach ("propagation") and the top-down ("back trace") approach are used.

At step 522, at least two mask layouts are output from the processor. The at least two mask layouts are for multi-patterning corresponding to each of at least the first and second groups of the patterns. For example, as illustrated in FIG. 10, the mask assignments for each pattern in sub-graphs 660 and 670 are output. Patterns 664 and 668 (in shaded polygons in FIG. 10) are assigned to the first mask. Patterns 662, 666 and 679 are assigned to the second mask.

Two masks including the first mask and the second mask are described for the purpose of illustration. In some embodiments, the at least two mask layouts for multi-patterning output from the processor comprises more than two mask layouts.

FIG. 12 is a block diagram of an embodiment of a system 800 for performing the method (500/502) for layout decomposition as described herein.

System 800 comprises at least a non-transitory, machine readable storage medium 806, and a processor 802 coupled to access the storage medium 806. The storage medium 806 is encoded with data representing a portion of a layout of a single layer of an integrated circuit to be multi-patterned. The portion of the layout has a plurality of patterns representing circuit elements. The processor 802 is programmed to perform a method as described above.

Referring to FIG. 12, processor 802 indicates that one or more programmed processors may be included. In some embodiments, the processing load is performed by two or more application programs, each operating on a separate processor. In other embodiments, the processes are all performed using one processor. Similarly, two media 806 and 808 are shown, but the data may be stored in any number of media. Although FIG. 8 shows an allocation of the various tasks to specific modules, this is only one example. The various tasks may be assigned to different modules to improve performance, or improve the ease of programming.

System 800 includes an electronic design automation ("EDA") tool such as "IC COMPILER"™, sold by Synopsys, Inc. of Mountain View, Calif., which may include a place and route tool 804, such as "ZROUTE"™, also sold by Synopsys. Other EDA tools may be used, such as the "VIRTUOSO" custom design platform or the Cadence "ENCOUNTER"® digital IC design platform may be used, along with the "VIRTUOSO" chip assembly router 804, all sold by Cadence Design Systems, Inc. of San Jose, Calif.

The EDA tool is a special purpose computer formed by retrieving stored program instructions from a non-transient computer readable storage medium 806 and executing the instructions on a general purpose processor 802. Thus, the instructions configure the logic circuits of the processor 802 to function as an EDA tool. Examples of non-transient computer readable storage mediums 806, 808 include, but are not limited to, hard disk drives (HDD), read only memories ("ROMs"), random access memories ("RAMs"), flash memories, or the like. Tangible, non-transient machine readable storage mediums 806, 808 are configured to store data generated by the place and route tool 804.

The router of the place and route tool 804 is capable of receiving an identification of a plurality of patterns to be included in an integrated circuit ("IC"). Router 804 may be equipped with a set of default design rules 822 and technology file 824. For performing the method described above, the technology file 824 can be modified to include factors for determining color-rule violations and spacing violations.

A graphical interface facilitates the design process by displaying conflict graphs and sub-graphs generated through programmed module 805 in processor 802. In some embodiments, a display 830 displays a graphical representation of the layout graph, and assists the user in the decomposition and mask assignment decisions.

A module 810 performs spacing relationship identification. In some embodiments, the spacing relationships are used to group the patterns into sub-graphs, as described in FIG. 5A, in a programmed module 814.

A module 816 performs mask assignment within each individual pattern within a sub-graph to either the first or the second of mask, as described in FIGS. 5A, and 7. A module 818 performs mask assignment for each sub-graph, as described in FIGS. 5B and 10. The mask assignments 818 are stored in a non-transitory machine readable storage medium 808.

In some embodiments, the IC layout is generated using an EDA tool. The method for layout decomposition, which is computer implemented, is performed on a separate specifically programmed processor.

The present disclosure provides a method for layout decomposition, and a system programmed to perform such a method. The method for layout decomposition comprises the following steps. A portion of a layout of a single layer of an integrated circuit to be multi-patterned is provided. The portion of the layout has a plurality of patterns representing circuit elements. Spacings between adjacent pairs of patterns within the plurality of patterns are determined. A conflict graph representing the layout is generated. The conflict graph having a plurality of sub-graphs. Each respective sub-graph has a respective vertex corresponding to each respective sub-graph. The patterns within each respective sub-graph are divided into at least a first group and a second group. Each of at least the first and second groups is to be assigned to be patterned on the single layer by a respectively different one of a first mask or a second mask. In a processor, a count of color-rule violations in the plurality of patterns within each respective sub-graph is determined based on a predetermined set of criteria. Within each sub-graph, assigning the first group of patterns in the sub-graph to the one of the first mask or the second mask which results in a smaller count of color-rule violations.

In some embodiments, the predetermined set of criteria for determining color-rule violations is based on the spacings and mask assignment of the at least the first and second groups. In some embodiments, each pattern of the first group to be patterned on the single layer provides a first conductive line embedded in a spacer material. Each pattern of the second group to be patterned on the single layer provides a second conductive line formed between adjacent ones of the spacer materials on the single layer. One of the second conductive lines between a pair of first conductive lines separated from each other by a spacing less than a preset distance results in a color-rule violation, if at least one corner of the second conductive line contacts a line-end part of the spacer material for at least one of two adjacent first conductive lines. In some embodiments, in the step of generating a conflict graph, the plurality of the patterns is subdivided into a plurality of sub-graphs, if two closest patterns from two respective sub-graphs are separated from each other by a spacing greater than a first threshold distance.

In some embodiments, the method further comprises additional steps. In a processor, a count of spacing violations between two respective sub-graphs is determined based on a predetermined set of criteria for spacing violations. In some embodiments, a spacing violation between two respective sub-graphs is counted if the spacing between two patterns in two different respective vertices corresponding to two respective sub-graphs is less than a second threshold distance. In some embodiments, a spacing violation between two respective sub-graphs is counted if the spacing between two patterns in two different respective vertices corresponding to the two respective sub-graphs is in the range from 100 nm to 140 nm.

In some embodiments, the method comprises generating an over-multi-patterning-technology (Over-MPT) graph representing the layout in a processor. The layout includes mask assignment to at least the first and second groups of the patterns to minimize a sum of the count of color-rule violations and the count of the spacing violations. In some embodiments, the method comprises assigning an edge in the over-MPT graph to connect two respective sub-graphs having a spacing violation. The edge is unconnected to any vertices corresponding to any other sub-graph if there are no spacing violations between said any vertices. The method further comprises outputting, from the processor, at least two mask layouts for multi-patterning corresponding to each of at least the first and second groups of the patterns.

The present disclosure provides a method for developing integrated circuit (IC) layout for multi-patterning. The method comprises the following steps. An IC layout of a single layer to be multi-patterned is provided. The IC layout has a plurality of patterns representing circuit elements. Spacings between adjacent pairs of patterns within the plurality of patterns are determined. A conflict graph representing the IC layout is generated. The conflict graph has a plurality of sub-graphs. Each respective sub-graph has a respective vertex corresponding to each respective sub-graph. The patterns within each respective sub-graph are divided into at least a first group and a second group. Each of at least the first and second groups is to be assigned to be patterned on the single layer by a respectively different one of a first mask or a second mask.

In a processor, a count of color-rule violations in the plurality of patterns within each respective sub-graph is determined based on a predetermined set of criteria. The predetermined set of criteria are based on the spacings and mask assignment for each of the at least the first and second groups. Within each sub-graph, the first group of patterns in the sub-graph is assigned to the one of the first mask or the second mask which results in a smaller count of color-rule violations. In a processor, a count of spacing violations between two respective sub-graphs is determined based on a predetermined set of criteria for spacing violations. An over-multi-patterning-technology (over-MPT) graph representing the layout is generated in a processor. An edge is assigned to connect two respective sub-graphs having a spacing violation. The over-MPT graph has mask assignment to each of at least the first and second groups of the patterns to minimize a sum of the count of color-rule violations and the count of the spacing violations. At least two mask layouts for multi-patterning corresponding to each of at least the first and second groups of the patterns are output in a processor.

In some embodiments, each pattern of the first group to be patterned provides a first conductive line embedded in a spacer material. Each pattern of the second group to be patterned provides a second conductive line on the single layer. One of the second conductive lines between a pair of first conductive lines separated from each other by a spacing less than a preset distance results in a color-rule violation, if at least one corner of the second conductive line contacts a line-end part of the spacer material for at least one of two adjacent first conductive lines.

In some embodiments, in the step of generating a conflict graph, the plurality of the patterns are subdivided into a plurality of sub-graphs if two closest patterns from two respective sub-graphs are separated from each other by a spacing greater than a first threshold distance. In some embodiments, a spacing violation between two respective sub-graphs is counted if the spacing between two patterns in two different respective vertices corresponding to two respective sub-graphs is in the range from 100 nm to 140 nm.

In another aspect, the present disclosure also provides a system for performing a method of layout decomposition. The system comprises a non-transitory, machine readable storage medium, and a processor coupled to access the storage medium. The storage medium is encoded with data representing a portion of a layout of a single layer of an integrated circuit to be multi-patterned. The portion of the layout has a plurality of patterns representing circuit elements. The processor is programmed to perform the method as described. The at least two mask layouts for multi-patterning output from the processor comprises more than two mask layouts.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method for layout decomposition, comprising:
providing a portion of a layout of a single layer of an integrated circuit to be multi-patterned, the portion of the layout having a plurality of patterns representing circuit elements;

determining spacings between adjacent pairs of patterns within the plurality of patterns;

generating a conflict graph representing the layout, the conflict graph having a plurality of sub-graphs, each respective sub-graph having a respective vertex corresponding to each respective sub-graph;

dividing the patterns within each respective sub-graph into at least a first group and a second group, each of at least the first and second groups to be assigned to be patterned on the single layer by a respectively different one of a first mask or a second mask;

determining, in a processor, a count of color-rule violations in the plurality of patterns within each respective sub-graph based on a predetermined set of criteria; and within each sub-graph, assigning the first group of patterns in the sub-graph to the one of the first mask or the second mask which results in a smaller count of color-rule violations.

2. The method of claim 1, wherein the predetermined set of criteria for determining color-rule violations is based on the spacings and mask assignment of the at least the first and second groups.

3. The method of claim 2, wherein each pattern of the first group to be patterned on the single layer provides a first conductive line embedded in a spacer material.

4. The method of claim 3, wherein each pattern of the second group to be patterned on the single layer provides a second conductive line formed between adjacent ones of the spacer materials on the single layer.

5. The method of claim 3, wherein one of the second conductive lines between a pair of first conductive lines separated from each other by a spacing less than a preset distance results in a color-rule violation if at least one corner of the second conductive line contacts a line-end part of the spacer material for at least one of two adjacent first conductive lines.

6. The method of claim 1, wherein in the step of generating a conflict graph, the plurality of the patterns are subdivided into a plurality of sub-graphs if two closest patterns from two respective sub-graphs are separated from each other by a spacing greater than a first threshold distance.

7. The method of claim 1, further comprising
determining, in a processor, a count of spacing violations between two respective sub-graphs based on a predetermined set of criteria for spacing violations.

8. The method of claim 7, wherein
a spacing violation between two respective sub-graphs is counted if the spacing between two patterns in two different respective vertices corresponding to two respective sub-graphs is less than a second threshold distance.

9. The method of claim 7, wherein
a spacing violation between two respective sub-graphs is counted if the spacing between two patterns in two respective vertices corresponding to two respective sub-graphs is in the range from 100 nm to 140 nm.

10. The method of claim 1, further comprising
generating an over-multi-patterning-technology (Over-MPT) graph representing the layout, in a processor, having mask assignment to at least the first and second groups of the patterns to minimize a sum of the count of color-rule violations and the count of the spacing violations, and
outputting, from the processor, at least two mask layouts for multi-patterning corresponding to each of at least the first and second groups of the patterns.

11. The method of claim 10, further comprising:
assigning an edge in the over-MPT graph to connect two respective sub-graphs having one or more spacing violation, wherein the edge is unconnected to any vertices corresponding to any other sub-graph if there are no spacing violations between said any vertices.

12. A method for developing integrated circuit (IC) layout for multi-patterning comprising:
providing an IC layout of a single layer to be multi-patterned, the IC layout having a plurality of patterns representing circuit elements;

determining spacings between adjacent pairs of patterns within the plurality of patterns;

generating a conflict graph representing the IC layout, the conflict graph having a plurality of sub-graphs, each respective sub-graph having a respective vertex corresponding to each respective sub-graph;

dividing the patterns within each respective sub-graph into at least a first group and a second group, each of at least the first and second groups to be assigned to be patterned on the single layer by a respectively different one of a first mask or a second mask;

determining, in a processor, a count of color-rule violations in the plurality of patterns within each respective sub-graph based on a predetermined set of criteria, the predetermined set of criteria based on the spacings and mask assignment for each of the at least the first and second groups;

within each sub-graph, assigning the first group of patterns in the sub-graph to the one of the first mask or the second mask which results in a smaller count of color-rule violations;

determining, in a processor, a count of spacing violations between two respective sub-graphs based on a predetermined set of criteria for spacing violations, with an edge assigned to connect two respective sub-graphs having a spacing violation;

generating an over-multi-patterning-technology (Over-MPT) graph representing the layout, in a processor, having mask assignment to each of at least the first and second groups of the patterns to minimize a sum of the count of color-rule violations and the count of the spacing violations, and outputting, in a processor, at least two mask layouts for multi-patterning corresponding to each of at least the first and second groups of the patterns.

13. The method of claim 12, wherein
each pattern of the first group to be patterned provides a first conductive line embedded in a spacer material;
each pattern of the second group to be patterned provides a second conductive line on the single layer; and
one of the second conductive lines between a pair of first conductive lines separated from each other by a spacing less than a preset distance results in a color-rule violation if at least one corner of the second conductive line contacts a line-end part of the spacer material for at least one of two adjacent first conductive lines.

14. The method of claim 12, wherein in the step of generating a conflict graph, the plurality of the patterns are subdivided into a plurality of sub-graphs if two closest patterns from two respective sub-graphs are separated from each other by a spacing greater than a first threshold distance.

15. The method of claim 12, wherein
a spacing violation between two respective sub-graphs is counted if the spacing between two patterns in two respective vertices corresponding to two respective sub-graphs is in the range from 100 nm to 140 nm.

16. A system, comprising:
a non-transitory, machine readable storage medium encoded with data representing a portion of a layout of a single layer of an integrated circuit to be multi-patterned, the portion of the layout having a plurality of patterns representing circuit elements; and a processor coupled to access the storage medium, the processor programmed to perform a method comprising:

determining spacings between adjacent pairs of patterns within the plurality of patterns;

generating a conflict graph representing the layout, the conflict graph having a plurality of sub-graphs, each respective sub-graph having a respective vertex corresponding to each respective sub-graph;

dividing the plurality of patterns within each respective sub-graph into at least a first group and a second group, each of at least the first and second groups to be assigned to be patterned on the single layer by a respectively different one of a first mask or a second mask;

determining a count of color-rule violations in the plurality of patterns within each respective sub-graph based on a predetermined set of criteria, the predetermined set of criteria for determining color-rule violations being based on the spacings and mask assignment of the at least the first and second groups; and within each sub-graph, assigning the first group of patterns in the sub-graph to the one of the first mask or the second mask which results in a smaller count of color-rule violations.

17. The system of claim 16, wherein in the method each pattern of the first group to be patterned provides a first conductive line embedded in a spacer material;

each pattern of the second group to be patterned provides a second conductive line on the single layer; and one of the second conductive lines between a pair of first conductive lines separated from each other by a spacing less than a preset distance results in a color-rule violation if at least one corner of the second conductive line contacts a line-end part of the spacer material for at least one of two adjacent first conductive lines.

18. The system of claim 16, wherein the processor is configured to perform the method further comprising determining a count of spacing violations between two respective sub-graphs based on a predetermined set of criteria for spacing violations, an edge being assigned to connect two respective sub-graphs having a spacing violation;

generating over-multi-patterning-technology (Over-MPT) graph representing the layout, having mask assignment to each of at least the first and second groups of the patterns to minimize a sum of the count of color-rule violations and the count of the spacing violations, and outputting at least two mask layouts for multi-patterning corresponding to each of at least the first and second groups of the patterns.

19. The system of claim 18, wherein in the method two closest patterns from two respective sub-graphs are separated from each other by a spacing greater than a first threshold distance; and a spacing violation between two respective sub-graphs is counted if the spacing between two patterns in two different respective vertices corresponding to two respective sub-graphs is less than a second threshold distance.

20. The system of claim 18, wherein the at least two mask layouts for multi-patterning output from the processor comprises more than two mask layouts.

* * * * *